United States Patent

Pawliw et al.

[11] 3,928,130
[45] Dec. 23, 1975

[54] SHEATH FOR NUCLEAR FUEL ELEMENTS

[75] Inventors: John Pawliw, Peterborough; Jarda Zabrodsky, Ottawa, both of Canada

[73] Assignee: General Electric Company, San Jose, Calif.

[22] Filed: June 19, 1973

[21] Appl. No.: 371,374

[30] Foreign Application Priority Data
Sept. 27, 1972 Canada............................ 152613

[52] U.S. Cl................................ 176/67; 176/91 R
[51] Int. Cl............................................ G21c 3/04
[58] Field of Search .......... 176/67, 68, 76, 77, 91 R

[56] References Cited
UNITED STATES PATENTS

| | | | |
|---|---|---|---|
| 3,108,936 | 10/1963 | Gale | 176/91 R |
| 3,166,614 | 1/1965 | Taylor | 176/91 R |
| 3,212,988 | 10/1965 | Ringot | 176/91 R |
| 3,212,989 | 10/1965 | Fitzer et al. | 176/67 |
| 3,290,223 | 12/1966 | Blocher, Jr. et al. | 176/91 R |
| 3,427,222 | 2/1969 | Biancheria et al. | 176/68 |
| 3,775,249 | 11/1973 | Clapham | 176/78 |

FOREIGN PATENTS OR APPLICATIONS

| | | | |
|---|---|---|---|
| 918,224 | 2/1963 | United Kingdom | 176/68 |

*Primary Examiner*—Samuel Feinberg
*Assistant Examiner*—C. T. Jordan
*Attorney, Agent, or Firm*—Ivor J. James, Jr.; Samuel E. Turner; Sam E. Laub

[57] ABSTRACT

A nuclear fuel element for use in a nuclear reactor is provided with a high strength sheath to limit the effects of forces acting internally and externally on the element when in service within a reactor.

8 Claims, 4 Drawing Figures

U.S. Patent    Dec. 23, 1975    3,928,130

SHEATH FOR NUCLEAR FUEL ELEMENTS

BACKGROUND OF THE INVENTION

This invention is directed to a method of fabricating a nuclear fuel and to the resulting nuclear fuel element thus produced.

Nuclear reactors are presently being designed, constructed and operated in which the nuclear fuel is contained in fuel elements which may have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves two primary purposes: first, to prevent contact and chemical reactions between the nuclear fuel and either the coolant or moderator if present, or both if both the coolant and moderator are present; and second, to prevent the radioactive fission products, some of which are gases, from being released from the fuel into the coolant or moderator or both if both the coolant and moderator are present. Common cladding materials are stainless steel, aluminum and its alloys, zirconium and its alloys, niobium (columbium) and certain magnesium alloys. The failure of the cladding, due to the build-up of gas pressure or other reasons, can contaminate the coolant or moderator and the associated systems with radioactive long-lived products to a degree which interferes with plant operation.

In the operation of nuclear reactors, problems are encountered in fabricating nuclear fuel elements in the form of rodded fuels suitable both economically and structurally for use under the operating conditions experienced within reactors. Thus, in providing suitable sheath materials disposed between the cladding and the nuclear fuel which is preferably in the form of pellets, it is necessary to compromise in the permissible thickness of sheath material, the neutron absorption cross-section characteristic of the sheath material, and the dimensional clearances and tolerances of the various components that constitute a complete fuel element.

In adopting a fuel canning method using a thin walled cladding of a zirconium tube to contain a stack of fuel pellets, the use of zirconium as a sheath material can lead to undesired stress conditions developing between the fuel pellets and the sheath.

In FIG. 1 is illustrated a fuel element of the prior art, having a cylindrical metallic sheath, generally of zirconium alloy or stainless steel, to isolate the fuel material from the reactor coolant fluid, with a plurality of fuel pellets of natural or enriched uranium therein, and end caps to close and seal the sheath.

SUMMARY OF THE INVENTION

The present invention provides a rodded nuclear fuel element of elongated cylindrical form having therein a fibrous sheath to contain fuel material, the sheath being of sufficient surface strength to withstand at least a portion of the stresses developed by the fuel material during operation within a reactor.

Many fibrous materials of high strength have been developed, including carbonaceous and boron filaments of high tensile strength. Many such filaments are further characterized by a uniformity of cross-section and smoothness of surface to provide uniform coat-forming capability, being possessed of great smoothness and strength. The combination of structural strength provided by a sheath so formed together with the fluid sealing properties of thin zirconium cladding provides a fuel element of high integrity and very low neutron capture cross-section.

It is contemplated as an object of this invention that fiber bonding agents substantially unaffected by neutron irradiation permit dispensing with a separate metallic casing.

DESCRIPTION OF THE DRAWINGS

Certain embodiments of the invention are described, reference being made to the accompanying drawings, wherein.

DESCRIPTION OF THE INVENTION

Figure 4:
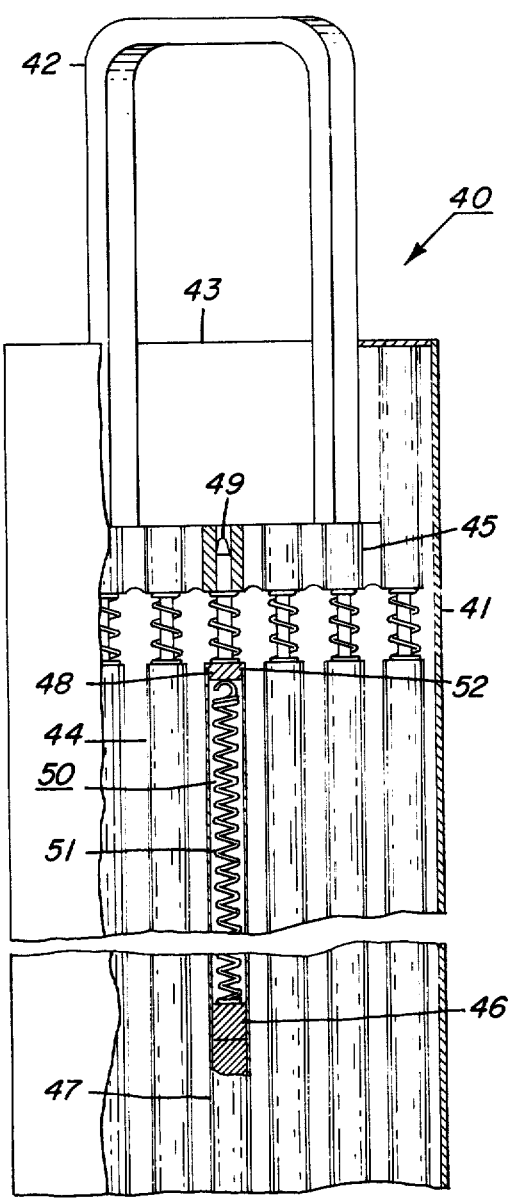
FIG. 4 presents a partial cutaway view of a nuclear fuel assembly containing nuclear fuel elements constructed according to the teaching of this invention with one element shown in partial sectional view.

Referring now more particularly to FIG. 4, there is shown a partially cutaway sectional view of a nuclear fuel assembly 40. This fuel assembly consists of a tubular flow channel 41 of square cross-section provided at its upper end with lifting bale 42 and at its lower end with a nose piece (not shown due to the lower portion of assembly 40 being omitted). The upper end of channel 41 is open at 43 and the lower end of the nose piece is provided with coolant flow openings. An array of fuel elements 44 is enclosed in channel 41 and supported therein by means of upper end plate 45 and a lower end plate (not shown due to the lower portion being omitted). The liquid coolant ordinarily enters through the openings in the lower end of the nose piece, passes upwardly around fuel elements 44, and discharges at upper outlet 43 in a partialy vaporized condition for boiling reactors or in an unvaporized condition for pressurized reactors at elevated temperatures.

A nuclear fuel element or rod is shown in partial sectional view constructed in accordance with the teachings of this invention. The fuel element includes fuel material 46, here shown as a plurality of fuel pellets of fissionable and/or fertile material positioned within a structural cladding or container 47. In some cases the fuel pellets may be of various shapes; in other cases different fuel forms such as particulate fuel may be used. Various nuclear fuel materials may be used including uranium compounds, plutonium compounds, thorium compounds, and mixtures thereof. A preferred fuel is uranium dioxide or a mixture comprising uranium dioxide and plutonium dioxide. The container is sealed at its ends by means of end plugs 48 which may include studs 49 to facilitate the mounting of the fuel rod in the assembly. A void space or plenum 50 is provided at one end of the fuel element to permit longitudinal expansion of the fuel material and accumulation of gases released from the fuel material. A fuel material retaining member 51 in the form of a helical member is positioned within space 50 ultimately to provide restraint against the axial movement of the pellet column, especially during handling and transportation of the fuel element. Cladding 47 is secured to end plugs 48 by means of circumferential welds 52.

Figure 2:
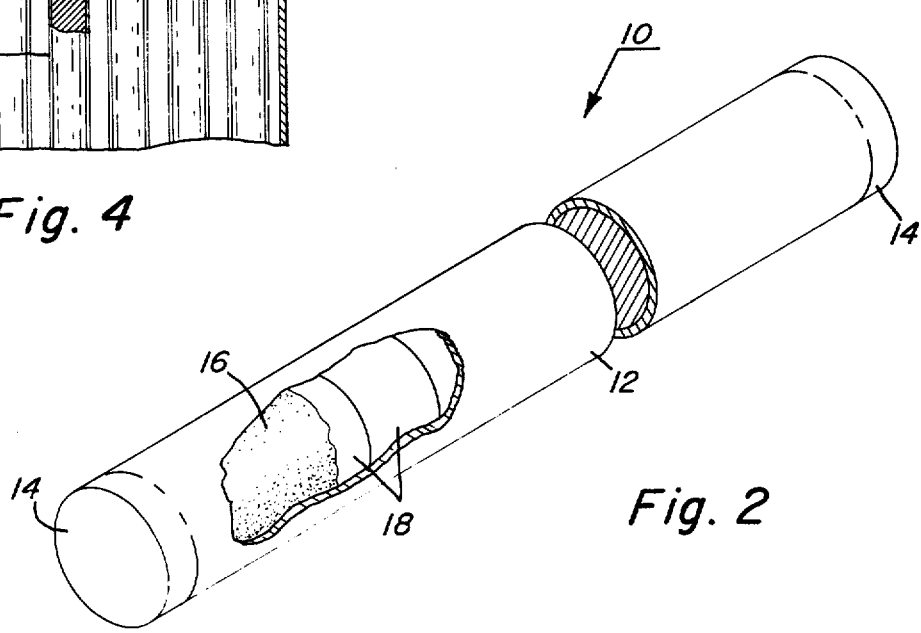
FIG. 2 is a similar view of a first fuel element utilizing in combination with the fuel a fiber sheath.

In FIG. 2 the illustrated fuel element 10 is provided with a composite assembly, comprising a fibrous inner sheath 16 within a metallic outer cladding 12, to contain nuclear fuel pellets 18 therein. End caps 14 are provided, in usual fashion, with any studs being omitted.

Figure 3:
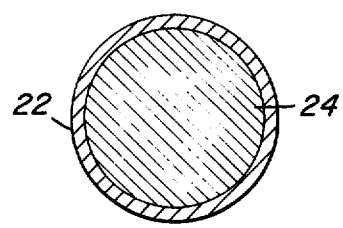
FIG. 3 is a cross-section of a fuel element utilizing a fiber sheath.
Figure 1:
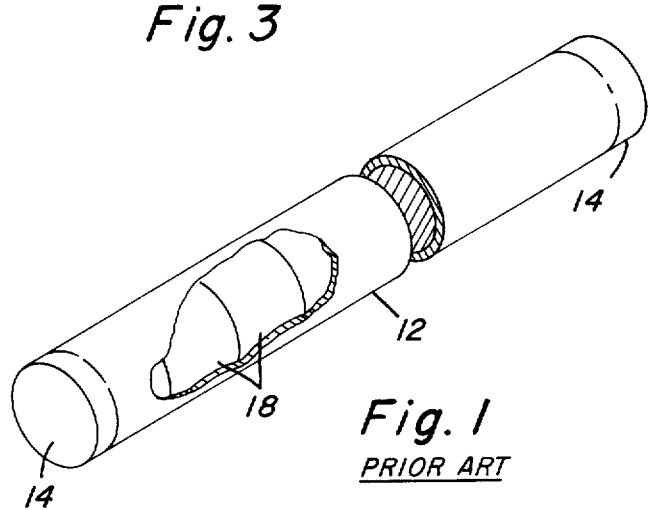
FIG. 1 is a partial section of fuel element according to the prior art as discussed above.

In the embodiment of FIG. 3, the separate metallic sheath of the prior art is dispensed with and the fuel material 24 is contained within the fabricated sheath 22. The use of suitable bonding agents including metallizing and/or plating to hermetically seal the sheath is contemplated. In this arrangement the use of elongated fuel rods is contemplated, as distinguished from fuel pellets, with the residual strength of the fuel material being combined with that of the sheath 22 to minimize the presence of sheath material and thereby reduce neutron absorption.

In addition to the foregoing enumerated advantages, adoption of the disclosed methods of fuel fabrication serves to improve reactor efficiency, improve fuel serviceability in relation to sheath durability, facilitate modes of operation with more rapid changes to reactor thermal loading, and enhance the structural and operational flexibility of the use of rodded fuels. In addition, the interposition of a fibrous sheath between nuclear fuel pellets and an outer metallic cladding tends to preclude or minimize galling, seizure and other mechanical interactions between the sheath, the cladding and the fuel, so as to avoid the creation of very high local stresses leading to sheath failure.

The containment of fuel chips by the fibrous sheath is also beneficial in avoiding high local stresses being exerted on the metallic cladding.

What is claimed is:

1. A nuclear fuel element which comprises an elongated cylindrical metallic container, a column of nuclear fuel material disposed in and partially filling said container thus leaving an internal cavity at one end of said container, an end plug secured and sealed at each end of said container, a fuel column retaining member positioned in said cavity, and a non-metallic sheath in wrapped relation with said column of said fuel material to contain at least a portion of the mechanical loads acting on said element during nuclear fission, said sheath being formed of fibrous material selected from the group of carbonaceous and boron filaments of high strength.

2. The nuclear fuel element of claim 1 in which the non-metallic sheath includes a bonding agent sealed in fluid proofing relation with the fibers of said sheath and the sheath extends in an abrasion protective relation about said fuel material.

3. A nuclear fuel element of claim 1 in which the sheath contains carbonaceous filaments.

4. A nuclear fuel element of claim 1 in which the sheath contains boron filaments.

5. A nuclear fuel element of claim 1 in which said container is formed of a material selected from the group consisting of zirconium and zirconium alloys.

6. A nuclear fuel element of claim 1 in which the nuclear fuel material is selected from the group consisting of uranium compounds, plutonium compounds, thorium compounds and mixtures thereof.

7. A nuclear fuel element of claim 1 in which the nuclear fuel material is comprised of uranium dioxide.

8. A nuclear fuel element of claim 1 in which the nuclear fuel material is a mixture comprising uranium dioxide and plutonium dioxide.

* * * * *